US010418916B2

(12) United States Patent
Zhang

(10) Patent No.: US 10,418,916 B2
(45) Date of Patent: Sep. 17, 2019

(54) CIRCUITS OF VOLTAGE SOURCE DC/AC CONVERTER WITH LCCL OR LCC FILTER AND OTHER MODIFIED FORMS, AND OPERATION OF MICROGRID WITH SUCH CIRCUITS

(71) Applicant: Daming Zhang, NSW (AU)

(72) Inventor: Daming Zhang, NSW (AU)

(73) Assignee: Daming Zhang, Kensington (AU)

( * ) Notice: Subject to any disclaimer, the term of this patent is extended or adjusted under 35 U.S.C. 154(b) by 0 days.

(21) Appl. No.: 16/063,701

(22) PCT Filed: Sep. 30, 2016

(86) PCT No.: PCT/AU2016/050930
§ 371 (c)(1),
(2) Date: Jun. 19, 2018

(87) PCT Pub. No.: WO2017/106902
PCT Pub. Date: Jun. 29, 2017

(65) Prior Publication Data
US 2019/0123662 A1    Apr. 25, 2019

(30) Foreign Application Priority Data
Dec. 23, 2015 (AU) ............... 2015905378

(51) Int. Cl.
*H02M 7/00* (2006.01)
*H02M 7/483* (2007.01)
(Continued)

(52) U.S. Cl.
CPC .......... *H02M 7/483* (2013.01); *H02M 1/126* (2013.01); *H02M 7/49* (2013.01); *H02M 7/48* (2013.01);
(Continued)

(58) Field of Classification Search
CPC ........ H02M 7/483; H02M 1/126; H02M 7/49; H02M 2007/4835; H02M 7/53871; H02M 7/48
See application file for complete search history.

(56) References Cited

U.S. PATENT DOCUMENTS 9,473,044 B2 * 10/2016 Somani ............. H02M 7/53875

* cited by examiner

*Primary Examiner* — Adolf D Berhane
*Assistant Examiner* — Afework S Demisse
(74) *Attorney, Agent, or Firm* — WPAT, P.C., Intellectual Property Attorneys; Anthony King

(57) ABSTRACT

This invention presents a new circuit topology formed by passive filter LCCL or LCC and voltage source DC/AC converter, which is named as fundamental forming unit. Compared with conventional LCL filter based DC/AC converter, the new converter circuits can handle wider range of power without suffering from disturbance by harmonic voltages and currents. For high voltage and high power application, circuits with multiple stages and multiple parallel branches are developed based on multiple fundamental forming units. Such circuits can be for general purpose application. They can also be for microgrid applications. Furthermore a new series of multistage DC/AC converters with LCL filter have also been developed to handle high power conversion at high voltage and high current levels. By applying such circuits to acting as grid-forming, grid-supporting and grid-feeding generators in a microgrid operating at constant frequency, the microgrid system can handle much higher power and can adapt to drastic change of renewable energy generation and load change. Such microgrid is operated using newly invented methods described in this disclosure.

6 Claims, 13 Drawing Sheets

(51) Int. Cl.
    *H02M 1/12*      (2006.01)
    *H02M 7/49*      (2007.01)
    *H02M 7/48*       (2007.01)
    *H02M 7/5387*     (2007.01)
(52) U.S. Cl.
    CPC   *H02M 7/53871* (2013.01); *H02M 2007/4835* (2013.01)

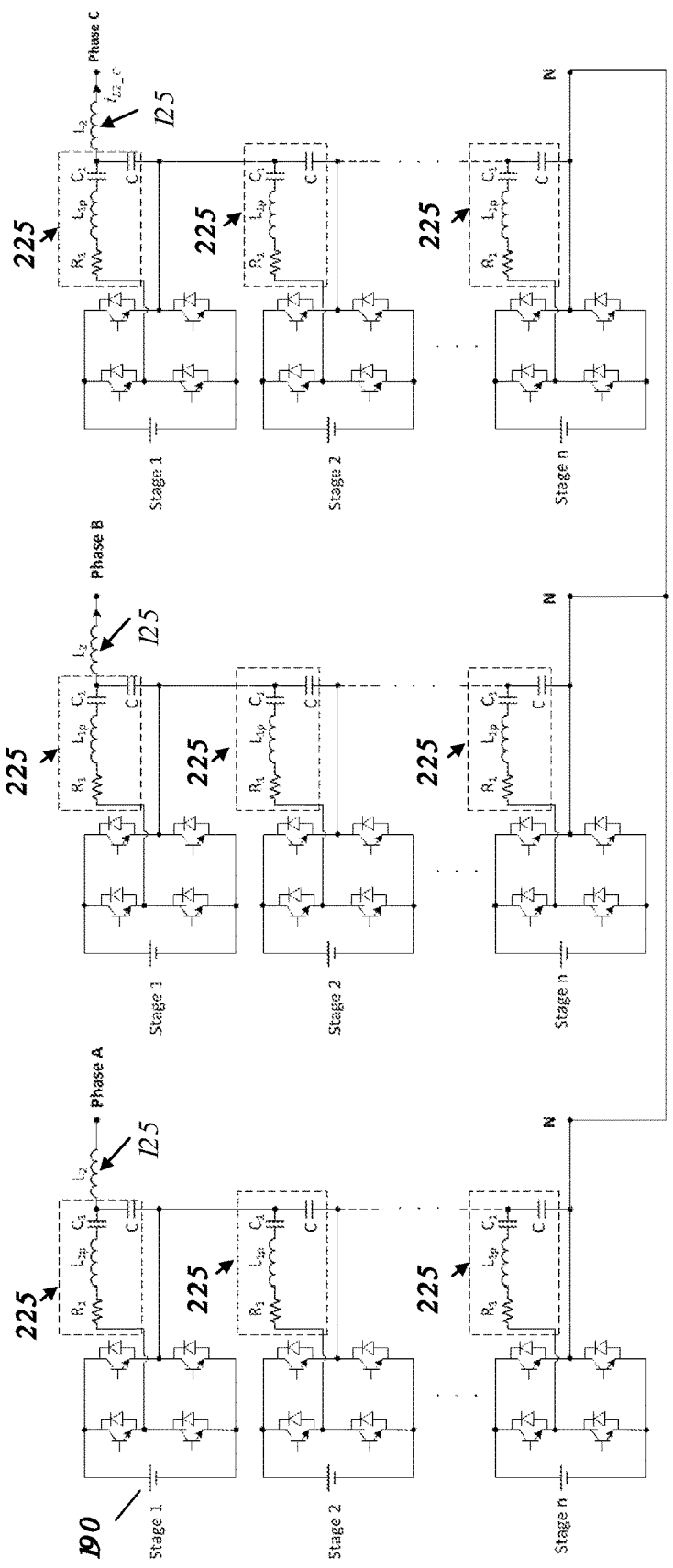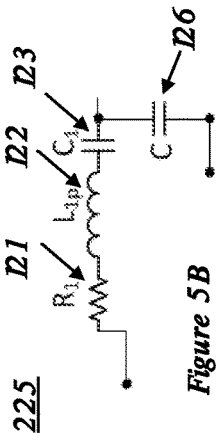
Figure 5A
Figure 5B

CIRCUITS OF VOLTAGE SOURCE DC/AC CONVERTER WITH LCCL OR LCC FILTER AND OTHER MODIFIED FORMS, AND OPERATION OF MICROGRID WITH SUCH CIRCUITS

FIELD OF THE INVENTION

The present invention relates to filter circuit topologies and in particular to application of new passive LCCL or LCC filter circuit topologies to single-stage voltage source DC/AC converters, either rectifiers or inverters, and applications of these filters to a new series of multistage voltage source DC/AC converters, either rectifiers or inverters for high voltage and large power applications.

The invention has been developed primarily for use in microgrid systems comprising multiple power sources of disparate types including any combination of solar, wind, hydro, fossil fuel power, or nuclear fusion or fission power sources, and energy storage etc. The invention will be described hereinafter with reference to this particular application. However, it will be appreciated that the invention is not limited to this particular field of use and may be used in general purpose applications.

BACKGROUND

Any discussion of the background art throughout the specification should in no way be considered as an admission that such background art is prior art nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of background publications are referred to herein, this reference does not constitute an admission that any of these documents are prior art, nor that they form part of the common general knowledge in the art, in Australia or in any other country.

Conventional voltage source DC/AC inverter with a typical LCL filter can only handle low power at low voltage applications. To increase power handling capability at high voltage, new circuits need be developed.

Furthermore to operate a conventional grid-tied voltage source DC/AC inverter with an LCL filter at relatively high power, the series inductance of the filter used with the inverter must be kept small to avoid excessive fundamental voltage drop across it. Due to this, harmonic components of the current into the grid at a lower percent of rated power could be more than its fundamental component. Moreover, such circuits with small series impedance could produce excessively high short-circuit currents which have the potential to damage other parts of the circuit. When such a converter is used as a grid-forming generator in a microgrid, it could lose its capability to take its grid-forming role when its operating power level is only a small fraction of its rated power. Hence new circuit topologies need be developed for both general purpose and microgrid applications.

A microgrid is an electrical system that includes multiple loads and distributed energy resources (DER) that can be operated in parallel with the broader utility grid or as an electrical island. It is difficult to manage electricity availability across the microgrid since renewable energy sources which often form part of the microgrid typically are inherently transient (e.g. solar power generation) and not often predictable (e.g., wind power generation).

An islanded microgrid is a microgrid that is separated from the main power grid in case of disturbances outside the microgrid.

Due to the drastic power generation variances inherent in renewable energy sources, the grid-forming generators and grid-supporting generators in the microgrid need to be very adaptive. Currently conventional circuit topologies and their control methods do not work properly to suit such sudden changes. Furthermore the traditional voltage and frequency droop based microgrid management method has drawbacks such as a) poor transient performance or instability issues due to the use of average values of active and reactive power over a cycle; b) ignoring load dynamics that can result in failure subsequent to large and/or rapid load changes; c) inability to narrow down the electrical supply frequency within certain limits independent of system loading conditions etc.

The present invention overcomes or ameliorates at least one or more of the disadvantages of the prior art, or to provide a useful alternative. The invention further provides systems and methods for operating a microgrid at high power levels, for example up to tens of Mega-Watts or higher.

Disclosed herein are applications of new LCCL or LCC filters to voltage source DC/AC converters or modified forms thereof of converters for general purpose usage and also for microgrid operation and management. The converters, either rectifiers or inverters can be single-stage or multi-stage for both single phase, three phase and other multiple phase applications.

There is a demand for applying the circuits disclosed herein as forming components in a microgrid and incorporating them with invented control methods to overcome the drawbacks in the design and operation of a microgrid.

SUMMARY

The present invention overcomes or ameliorates at least one or more of the disadvantages of the prior art, or to provide a useful alternative.

One embodiment provides a system configured for performing a method as described herein.

The systems and methods disclosed herein provide a new circuit topology formed by passive filter LCCL or LCC and voltage source DC/AC converter, which is named as fundamental forming unit.

Compared with conventional LCL filter based DC/AC converter, the converter circuits as disclosed herein can handle wider range of power without suffering from disturbance by harmonic voltages and currents. For high voltage and high power application, circuits with multiple stages and multiple parallel branches are developed based on multiple fundamental forming units. Such circuits can be for general purpose application. They can also be for microgrid applications.

Furthermore a new series of multistage DC/AC converters with LCL filter have also been developed to handle high power conversion at high voltage and high current levels.

By applying such circuits to acting as grid-forming, grid-supporting and grid-feeding generators in a microgrid operating at constant frequency or nearly constant frequency, the microgrid system can handle much higher power and can adapt to drastic change of renewable energy generation and load change.

According to a first aspect of the invention, there is provided a first three-phase DC/AC converter circuit. The circuit may operate at a fundamental frequency, e.g. 50 Hz or 60 Hz. The circuit may be adapted for converting DC power to AC power or vice versa. The circuit may comprise a DC source or an equivalent DC source or one DC-link capacitor or two DC-link capacitors with a split neutral point or an equivalent DC load. The circuit may further comprise a three-phase voltage source DC/AC converter with a DC side and an AC side. The AC side may be connected with either an AC grid or an AC load through a three phase LCCL filter. Each phase of the three-phase LCCL filter may each comprise a series inductor at the AC side of the DC/AC converter, and a series capacitor located after the series inductor. The series capacitor may be connected in series with the series inductor. Each phase of the circuit may further comprise a shunt capacitor located after the series capacitor. The shunt capacitor may be connected in parallel after the series capacitor. Each phase of the circuit may further comprise a terminal inductor located after the shunt capacitor. The terminal inductor may be connected in series after the series capacitor and the shunt capacitor. The terminal inductor may be connected with either the AC grid or the AC load. The three shunt capacitors, one shunt capacitor for each phase of the three phase circuit, may be arranged either in Y or Delta connection.

According to a second aspect of the present invention, there is provided a second three-phase DC/AC converter circuit. The circuit may operate at a fundamental frequency, e.g. 50 Hz or 60 Hz. The circuit may be adapted for converting DC power to AC power or vice versa. The circuit may comprise a DC source or an equivalent DC source or one DC-link capacitor or two DC-link capacitors with a split neutral point or an equivalent DC load. The circuit may further comprise a three-phase voltage source DC/AC converter with a DC side and an AC side. The AC side may be connected with either an AC grid or an AC load through a three phase LCC filter. Each phase of the three-phase LCC filter may comprise a series inductor at the AC side of the DC/AC converter. Each phase of the three-phase LCC filter may further comprise a series capacitor located after the series inductor and connected in series with the series inductor. Each phase of the three-phase LCC filter may further comprise a shunt capacitor located after the series capacitor. The shunt capacitor may be connected in parallel after the series capacitor. The three shunt capacitors, one shunt capacitor for each phase of the three phase circuit, may be arranged in either a Y or a Delta connection.

According to a third aspect of the present invention, there is provided a first n-phase DC/AC converter circuit, for converting DC power to AC power or vice versa, comprising any one group of n identical first single-phase DC/AC converter circuits, n identical first enhanced single phase DC/AC converter circuits and n identical first augmented single phase DC/AC converter circuits. Further, n is an integer greater than or equal to three, e.g. n equals either 3, 4, 5, 6, 7, 8, 9, 10 or any integer greater than 10. Further, each first single phase DC/AC converter circuit of the n identical first single-phase DC/AC converter circuits comprises a plurality of stages or cells, wherein a first stage or cell, of the plurality of stages or cells, comprises a first circuit comprising a DC source or a DC load, a single-phase voltage source DC/AC converter with a DC side and an AC side, a single phase LCCL filter, comprising a series inductor at the AC side of the single-phase voltage source DC/AC converter, a series capacitor located after the series inductor and connected in series with the series inductor, a shunt capacitor located after the series capacitor and connected in parallel after the series capacitor, a terminal inductor located after the shunt capacitor and connected in series after the series capacitor and the shunt capacitor. Further, each subsequent stage or cell, of the plurality of stages or cells, comprises a first modified circuit obtained from modifying the first circuit, such that the terminal inductor is excluded or replaced by a short circuit. Further, the plurality of stages or cells are electrically connected by connecting the respective shunt capacitors of each stage or cell in series. Further, the plurality of stages or cells share the terminal inductor from the first circuit of the first stage or cell and connected with either an AC grid or an AC load. Further, each first enhanced single phase DC/AC converter circuit of the n first enhanced single phase DC/AC converter circuit comprises a plurality of the first single-phase DC/AC converter circuits being electrically connected in parallel. Also, each first augmented single phase DC/AC converter circuit of the n first augmented single phase DC/AC converter circuits comprises a plurality of first modified circuits, the plurality of first modified circuits being connected in parallel and the terminal inductor placed after the parallel connection of the plurality of first modified circuits, and connected with either the AC load or the AC grid.

According to a fourth aspect of the present invention, there is provided a first enhanced DC/AC converter circuit for converting DC power to AC power or vice versa, comprising a plurality of first single-phase DC/AC converter circuits being electrically connected in parallel. Further, each first single phase DC/AC converter circuit of the plurality first single-phase DC/AC converter circuits comprises a plurality of stages or cells. Further, a first stage or cell, of the plurality of stages or cells, comprises a first circuit comprising a DC source or an equivalent DC source or an equivalent DC load, a single-phase voltage source DC/AC converter with a DC side and an AC side, a single phase LCCL filter, comprising a series inductor at the AC side of the single-phase voltage source DC/AC converter, a series capacitor located after the series inductor and connected in series with the series inductor, a shunt capacitor located after the series capacitor and connected in parallel after the series capacitor, a terminal inductor located after the shunt capacitor and connected in series after the series capacitor and the shunt capacitor. Further, each subsequent stage or cell, of the plurality of stages or cells, comprises a first modified circuit obtained from modifying the first circuit, such that the terminal inductor is excluded or replaced by a short circuit. Further, the plurality of stages or cells are electrically connected by connecting the respective shunt capacitors of each stage or cell in series. Also, the plurality of stages or cells share the terminal inductor from the first circuit of the first stage or cell and connected with either an AC grid or an AC load.

According to a fifth aspect of the present invention, there is provided a first augmented DC/AC converter circuit for converting DC power to AC power or vice versa, comprising a plurality of first modified circuits, the plurality of first modified circuits being connected in parallel and the terminal inductor placed after the parallel connection of the plurality of first modified circuits, and connected with either an AC grid or an AC load. Further, the first modified circuit is obtained from modifying a first circuit, such that a terminal inductor is excluded or replaced by a short circuit. Further, the first circuit comprises a DC source or an equivalent DC source or an equivalent DC load, a single-phase voltage source DC/AC converter with a DC side and an AC side, a single phase LCCL filter, comprising a series inductor at the AC side of the single-phase voltage source DC/AC converter, a series capacitor located after the series inductor and connected in series with the series inductor, a shunt capacitor located after the series capacitor and connected in parallel after the series capacitor, the terminal inductor located after the shunt capacitor and connected in series after the series capacitor and the shunt capacitor.

According to a sixth aspect of the present invention, there is provided a first single-phase DC/AC converter circuit, for converting DC power to AC power or vice versa, comprising a plurality of stages or cells. Further, a first stage or cell, of the plurality of stages or cells, comprises a first circuit comprising a DC source or an equivalent DC source or an equivalent DC load, a single-phase voltage source DC/AC converter with a DC side and an AC side, a single phase LCCL filter, comprising a series inductor at the AC side of the single-phase voltage source DC/AC converter, a series capacitor located after the series inductor and connected in series with the series inductor, a shunt capacitor located after the series capacitor and connected in parallel after the series capacitor, a terminal inductor located after the shunt capacitor and connected in series after the series capacitor and the shunt capacitor, and each subsequent stage or cell, of the plurality of stages or cells, comprises a first modified circuit obtained from modifying the first circuit, such that the terminal inductor is excluded or replaced by a short circuit. Further, the plurality of first stages or cells are electrically connected by connecting the respective shunt capacitors of each stage or cell in series. Also, the plurality of stages or cells share a common terminal inductor from the first circuit of the first primary stage or cell and connected with either an AC grid or an AC load.

According to a seventh aspect of the present invention, there is provided a second single-phase DC/AC converter circuit, for converting DC power to AC power or vice versa, comprising a plurality of branches electrically connected in parallel, each branch, of the plurality of branches, comprising a DC source or an equivalent DC source or an equivalent DC load, a single-phase voltage source DC/AC converter with a DC side and an AC side, an LC filter, comprising a series inductor at the AC side of the single-phase voltage source DC/AC converter and a series capacitor located after the series inductor and connected in series with the series inductor. Further, the plurality of branches join through a common shunt capacitor located after the respective series capacitors of each branch and share a terminal inductor connected with either an AC grid or an AC load.

According to an eighth aspect of the present invention, there is provided a second n-phase DC/AC converter circuit, comprising n identical second single-phase DC/AC converter circuits, wherein each second single-phase DC/AC converter circuit of the n identical second single-phase DC/AC converter circuits comprises a plurality of branches electrically connected in parallel, each branch, of the plurality of branches, comprising a DC source or an equivalent DC source or an equivalent DC load, a single-phase voltage source DC/AC converter with a DC side and an AC side, an LC filter, comprising a series inductor at the AC side of the single-phase voltage source DC/AC converter and a series capacitor located after the series inductor and connected in series with the series inductor. Further, the plurality of branches join through a common shunt capacitor located after the respective series capacitors of each branch and share a terminal inductor connected with either an AC grid or an AC load. Further, n is an integer greater than or equal to three.

According to a ninth aspect of the present invention, there is provided a second enhanced single-phase DC/AC converter circuit, comprising a plurality of stages or cells. Further, a first stage or cell, of the plurality of stages or cells, comprises a second single-phase DC/AC converter circuit. Further, the second enhanced single-phase DC/AC converter circuit comprises a plurality of branches electrically connected in parallel, each branch, of the plurality of branches, comprising a DC source or an equivalent DC source or an equivalent DC load, a single-phase voltage source DC/AC converter with a DC side and an AC side, an LC filter, comprising a series inductor at the AC side of the single-phase voltage source DC/AC converter and a series capacitor located after the series inductor and connected in series with the series inductor. Further, the plurality of branches join through a common shunt capacitor located after the respective series capacitors of each branch and share a terminal inductor connected with either an AC grid or an AC load. Further, each subsequent stage or cell comprises a second modified circuit obtained from modifying the second single-phase DC/AC converter circuit wherein the terminal inductor is excluded or replaced by a short circuit. Further, the plurality of stages or cells are electrically connected by connecting the respective shunt capacitors in series. Also, the plurality of stages or cells share the terminal inductor from the first stage or cell and connected with either an AC grid or an AC load.

According to a tenth aspect of the present invention, there is provided a third n-phase DC/AC converter circuit, consisting of n identical second enhanced single-phase DC/AC converter circuits, where n is an integer greater than or equal to three. Further, each second enhanced single-phase DC/AC converter circuit of the n identical second enhanced single-phase DC/AC converter circuits, comprises a plurality of stages or cells. Further, a first stage or cell, of the plurality of stages or cells, comprises a second single-phase DC/AC converter circuit. Further, the second single-phase DC/AC converter circuit comprises a plurality of branches electrically connected in parallel, each branch, of the plurality of branches, comprising, a DC source or an equivalent DC source or an equivalent DC load, a single-phase voltage source DC/AC converter with a DC side and an AC side, an LC filter, comprising a series inductor at the AC side of the single-phase voltage source DC/AC converter and a series capacitor located after the series inductor and connected in series with the series inductor. Further, the plurality of branches join through a common shunt capacitor located after the respective series capacitors of each branch and share a terminal inductor connected with either an AC grid or an AC load. Further, each subsequent stage or cell comprises a second modified circuit obtained from modifying the second single-phase DC/AC converter circuit wherein the terminal inductor is excluded or replaced by a short circuit. Further, the plurality of stages or cells are electrically connected by connecting the respective shunt capacitors in series. Also, the plurality of stages or cells share the terminal inductor from the first stage or cell and connected with either an AC grid or an AC load.

According to an eleventh aspect of the present invention, there is provided a single-phase multi-cell or multi-stage converter circuit, comprising a plurality of identical stages or cells, each of the plurality of identical stages or cells comprising an H-bridge DC/AC converter cell and an equivalent LC filter, each H-bridge DC/AC converter cell comprising a DC source or an equivalent DC source or an equivalent DC load, an H-bridge converter with an AC side and a DC side with the equivalent LC filter placed at the AC side of the H-bridge converter. Further, each equivalent LC filter comprises, an equivalent inductor at the AC side of the respective H-bridge DC/AC converter and a shunt capacitor after the equivalent inductor, the shunt capacitor being connected in parallel after the equivalent inductor. Further, the plurality of identical stages or cells are connected through connecting in series, the respective shunt capacitors in each identical stage or cell. Also, a first stage or cell is added with a terminal inductor after the shunt capacitor.

According to a twelfth aspect of the present invention, there is provided a third single-phase DC/AC converter circuit, comprising a plurality of single-phase multi-cell or multi-stage converter circuits, each single-phase multi-cell or multi-stage converter circuit comprising a plurality of identical stages or cells, each of the plurality of identical stages or cells comprising an H-bridge DC/AC converter cell and an equivalent LC filter, each H-bridge DC/AC converter cell comprising a DC source or an equivalent DC source or an equivalent DC load, an H-bridge converter with an AC side and a DC side with the equivalent LC filter placed at the AC side of the H-bridge converter. Further, each equivalent LC filter comprises an equivalent inductor at the AC side of the respective H-bridge DC/AC converter and a shunt capacitor after the equivalent inductor, the shunt capacitor being connected in parallel after the equivalent inductor. Further, the plurality of identical stages or cells are connected through connecting in series, the respective shunt capacitors in each identical stage or cell. Also, a first identical stage or cell is added with a terminal inductor after the shunt capacitor. Further, the plurality of single-phase multi-cell or multi-stage converter circuits are connected in parallel.

According to a thirteenth aspect of the present invention, there is provided a fourth n-phase DC/AC converter circuit, consisting of n identical single-phase multi-cell or multi-stage converter circuit or n identical third single-phase DC/AC converter circuit. Further, each single-phase multi-cell or multi-stage converter circuit comprises a plurality of identical stages or cells, each of the plurality of identical stages or cells comprising an H-bridge DC/AC converter cell and an equivalent LC filter, each H-bridge DC/AC converter cell comprising a DC source or an equivalent DC source or an equivalent DC load, an H-bridge converter with an AC side and a DC side with the equivalent LC filter placed at the AC side of the H-bridge converter. Further, each equivalent LC filter comprises an equivalent inductor at the AC side of the respective H-bridge DC/AC converter and a shunt capacitor after the equivalent inductor, the shunt capacitor being connected in parallel after the equivalent inductor. Further, the plurality of identical stages or cells are connected through connecting in series, the respective shunt capacitors in each identical stage or cell. Further, a first identical stage or cell is added with a terminal inductor after the shunt capacitor. Further, each third single-phase DC/AC converter circuit comprises a plurality of single-phase multi-cell or multi-stage converter circuits, each single-phase multi-cell or multi-stage converter circuit comprising a plurality of identical stages or cells, each of the plurality of identical stages or cells comprising the H-bridge DC/AC converter cell and the equivalent LC filter, each H-bridge DC/AC converter cell comprising the DC source or an equivalent DC source or an equivalent DC load, the H-bridge converter with the AC side and the DC side with the equivalent LC filter placed at the AC side of the H-bridge converter and the each equivalent LC filter comprising the equivalent inductor at the AC side of the respective H-bridge DC/AC converter and the shunt capacitor after the equivalent inductor, the shunt capacitor being connected in parallel after the equivalent inductor. Further, the plurality of identical stages or cells are connected through connecting in series, the respective shunt capacitors in each identical stage or cell. Also, a first identical stage or cell is added with a terminal inductor after the shunt capacitor. Further, n is an integer greater than or equal to three.

According to a fourteenth aspect of the present invention, there is provided a method for operating a microgrid, the method comprising a grid-forming generator producing its reference voltage with a constant system frequency either 50 Hz or 60 Hz or other fundamental frequency; and the grid-forming generator producing the output real power reference based on its terminal voltage's variation from its rated value or other predetermined voltage value or producing fixed real and reactive power references; and the grid-supporting generators taking the voltages at their respective coupling points with the microgrid as references; and the grid-supporting generators producing their respective real power references based on their respective terminal voltages' variation from their respective rated values or other pre-determined values, and each of the grid-supporting generators having its respective upper limit for output real power reference; and dynamic reactive power compensations or power factor corrections being adopted at different locations in the microgrid to make the power factor close to one at each of major buses or at each of major loads or groups of loads or groups of equivalent loads.

In one embodiment, the method further comprises the step of transferring, by the grid-forming generator, a system-demanded reactive power to and from accompanying or remotely located reactive power compensators and outputting a nearly-zero or other small amount of reactive power.

In one embodiment, the method further comprises steps to include domains of conventional generators, wherein conventional generators such as hydro-electric power generations and diesel-engine generations are adopted to power loads in the microgrid in the form of domains, wherein one or multiple such generations are contained in each domain to power loads in that domain; and each domain is interconnected at its every joining point with other parts of the microgrid through back-to-back converters or through other AC power to AC power converters; and through which power is exchanged between each domain and other parts of the microgrid.

In one embodiment, the method further comprises steps to store extra energy in the microgrid in gravitational heavy mass potential energy storage systems, wherein the heavy masses are transported from low gravitational level or low lands or low platforms to high gravitational level or high lands or high platforms by operating electric machines as electric motors, when there is an extra energy in the microgrid; and the heavy masses are transported from high gravitational platforms or high lands to low platforms or low lands by operating the electric machines as electric generators to feed the electricity to the microgrid when the microgrid is short of real power.

According to a fifteenth aspect of the present invention, there is provided a method to manage inter-connected microgrids operating in island-mode, wherein back-to-back converters or other AC power to AC power converters are adopted to interconnect any two neighbouring microgrids; and each microgrid is operated using the method as described above; in each microgrid, conventional generators such as hydro-electric power generations and diesel-engine generations are adopted to power loads in the microgrid in the form of domains, wherein each domain may contain one or multiple such generators to power loads in the domain; and each domain is interconnected at its every joining point with other parts of the microgrid through back-to-back converters or through other AC power to AC power converters; and through which power is exchanged between each domain and other parts of the microgrid.

In one embodiment, the method further comprises steps to store extra energy in the microgrid in gravitational heavy mass potential energy storage systems, wherein the heavy masses are transported from low gravitational level or low lands or low platforms to high gravitational level or high lands or high platforms by operating electric machines as electric motors, when there is an extra energy in the microgrid; and the heavy masses are transported from high gravitational platforms or high lands to low platforms or low lands by operating the electric machines as electric generators to feed the electricity to the microgrid when the microgrid is short of real power.

According to a sixteenth aspect of the present invention, there is provided a microgrid comprising: a plurality of grid forming generators; a plurality of grid supporting generators; a plurality of grid feeding generators; wherein each of the grid forming generator, the grid supporting generator and the grid feeding generator comprises any one selected from a group of a first three phase DC/AC converter circuit, a first n-phase DC/AC converter circuit, a second n-phase DC/AC converter circuit, a third n-phase DC/AC converter circuit and a fourth n-phase DC/AC convener circuit, with n being equal to 3.

In one embodiment, the microgrid is one of two or more interconnected microgrids.

In one embodiment, the microgrid is selected from the group of an islanded microgrid, a standalone microgrid and a standalone powergrid, and comprises a plurality of domains, each domain of the plurality of domains comprising one or more conventional generators.

According to a fifteenth aspect of the present invention, there is provided a microgrid comprising a grid forming generator, a grid supporting generator and a grid feeding generator. Further, each of the grid forming generator, the grid supporting generator and the grid feeding generator comprises any one selected from a group of a first three phase DC/AC converter circuit, a first n-phase DC/AC converter circuit, a second n-phase DC/AC converter circuit, a third n-phase DC/AC converter circuit and a fourth n-phase DC/AC converter circuit, where n is three.

According to a sixteenth aspect of the present invention, there is provided a method for operating standalone grid or islanded microgrid, wherein conventional generators such as diesel engine-powered generators or hydro-electric generators etc are arranged in the form of domain to power loads in the domain. At each point of interface between the domain and other parts of microgrids, back-to-back converters or other AC power to AC power converters are taken to exchange power between them. Furthermore gravitational energy storage could be adopted to store extra energy from renewable energy generation in the power grid or microgrid.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 5A shows a first example topology for application of an LCCL filter to a multi-stage converter;

FIG. 5B shows an LCC structure;

DEFINITIONS

Figure 1:
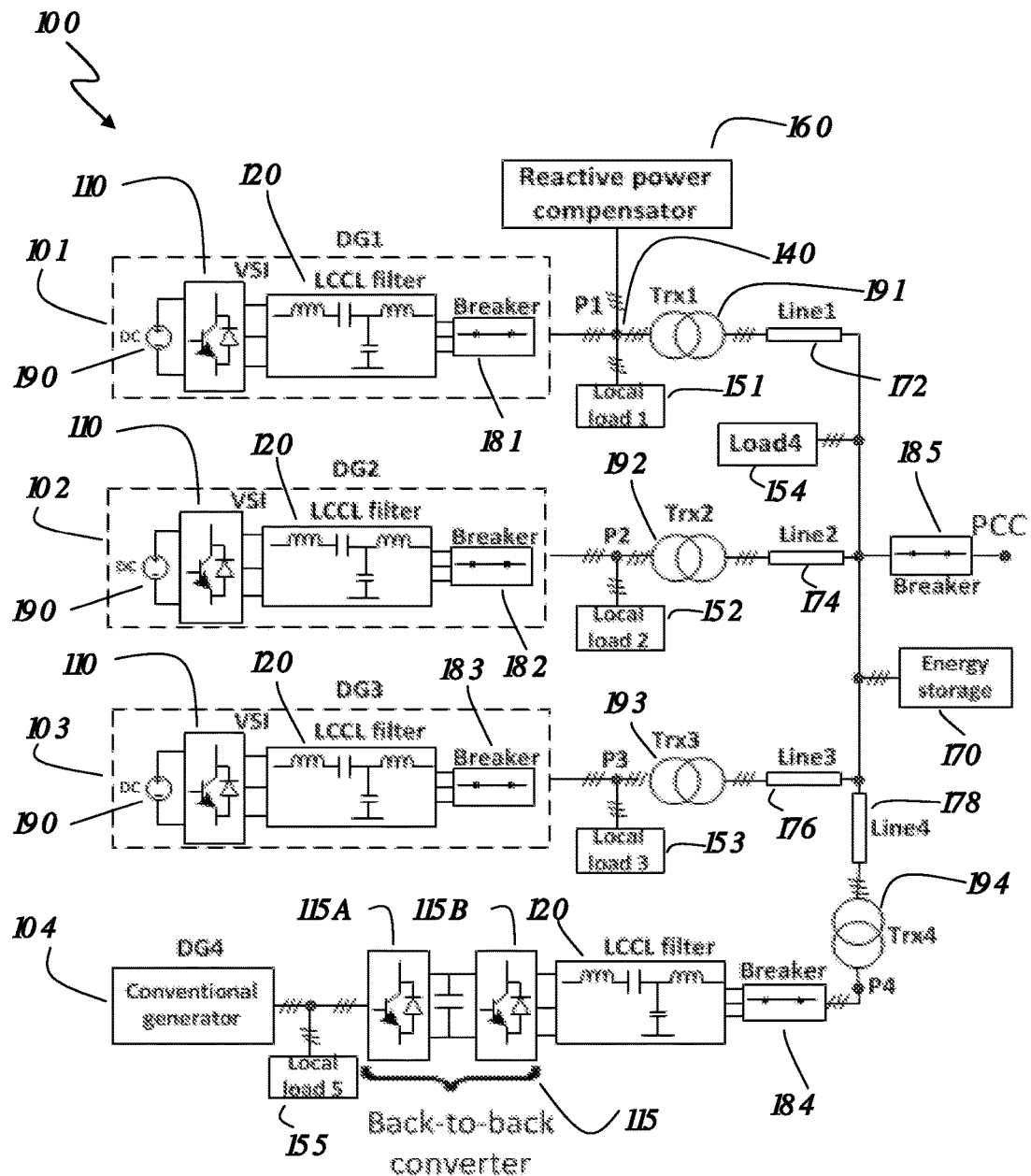
FIG. 1 shows circuit diagram of a sample microgrid.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

All of the publications cited in this specification are herein incorporated in their entirety by cross-reference.
For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

The term, "real-time", for example "displaying real-time data," refers to the display of the data without intentional delay, given the processing limitations of the system and the time required to accurately measure the data.

The term. "near-real-time", for example "obtaining real-time or near-real-time data" refers to the obtaining of data either without intentional delay ("real-time") or as close to real-time as practically possible (i.e. with a small, but minimal, amount of delay whether intentional or not within the constraints and processing limitations of the of the system for obtaining and recording or transmitting the data.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

PQ Control Method

PQ control method referred in this invention denotes real and reactive power control based on either stationary reference frame or natural reference frame or synchronous reference frame. Detailed description of the PQ control method can be found from Erika Twining, and Donald Grahame Holmes, "Grid Current Regulation of a Three-Phase Voltage Source Inverter with an LCL Input Filter", IEEE TRANSACTIONS ON POWER ELECTRONICS, VOL. 18, No. 3, May 2003, pp. 888-895, incorporated herein in its entirety by cross-reference, and other journal and conference papers.

De-Coupled PQ Control

De-coupled PQ control referred in this invention denotes that a grid-forming generator formed by a voltage source inverter separates real power and reactive power control in a microgrid operation. It produces its own reference voltage at constant frequency, generates its real power reference based on the deviation of its terminal voltage from its rated value or other specified value and sets reactive power reference to zero or a very small value. Hence it only outputs real power demanded by the microgrid and outputs nearly zero reactive power. It could also serve as a reactive power sensor by sensing the output of reactive power at its terminal, and transfers system-demanded reactive power to and from separate reactive power compensators. By doing so, the output real power from the grid-forming generator can follow its reference accurately.

Grid-Supporting Generator

Grid-supporting generator referred here in this invention denotes a generator in a microgrid which takes its terminal voltage as reference, use PQ control with real power reference produced based on deviation of its terminal voltage from its rated value or other specified values and its reactive power reference set to either zero or very small value. By doing so, its output real power can follow its reference very accurately. It may have pre-set lower and upper limits of real power reference.

Grid-Feeding Generator

Grid-feeding generator referred here in this invention denotes a generator which takes its terminal voltage as reference, and use PQ control method. They can be mainly used for harnessing renewable energy with maximum power point tracking. They can be for other general use as well.

Grid-Forming Generator

Grid-forming generator referred here in this invention denotes a generator which produces fundamental voltage reference for a whole microgrid. It produces reference voltage with constant frequency by itself and generates real power reference based on the deviation of its terminal voltage from its rated value or other specified values with the reactive power reference set to zero or to a very small value. It could serve as a reactive power sensor as well by sensing the output of reactive power at its terminal and transfers the reactive power demanded by the system to and from other reactive power compensators.

DETAILED DESCRIPTION

It should be noted in the following description that like or the same reference numerals in different embodiments denote the same or similar features.

Disclosed herein are new passive filter topologies integrated with single-stage or multistage DC/AC converters, either rectifiers or inverters. Such converters with passive filters can be for general usage. They can also be applied for the formation and operation of a microgrid to provide capability to cope with rapid and/or large changes in the power output from grid-forming, grid-supporting and grid-feeding generators or in the loads.

Figure 2A:
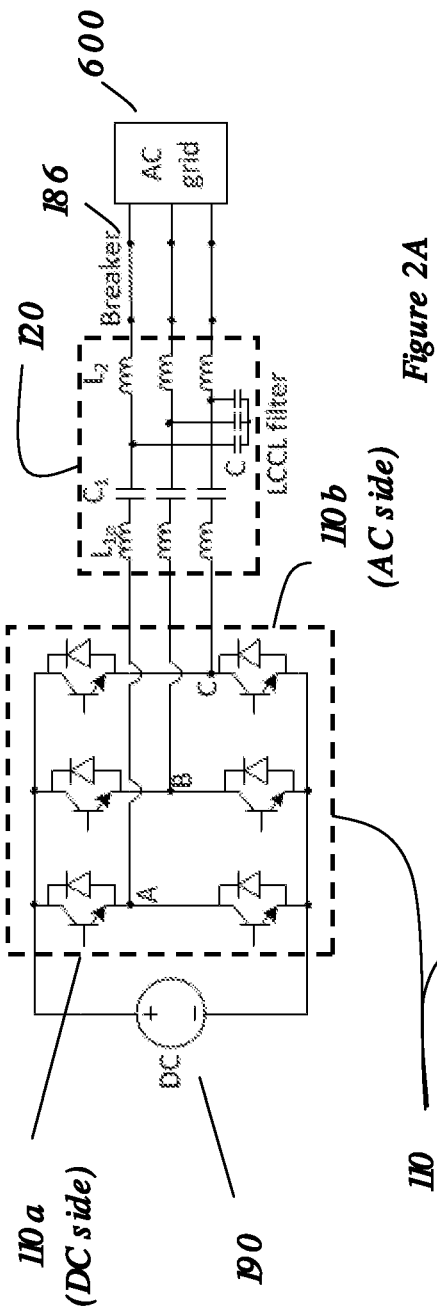
FIG. 2A shows a three-phase grid-tied DC/AC converter with an LCCL filter as disclosed herein either as inverter or rectifier.
Figure 2B:
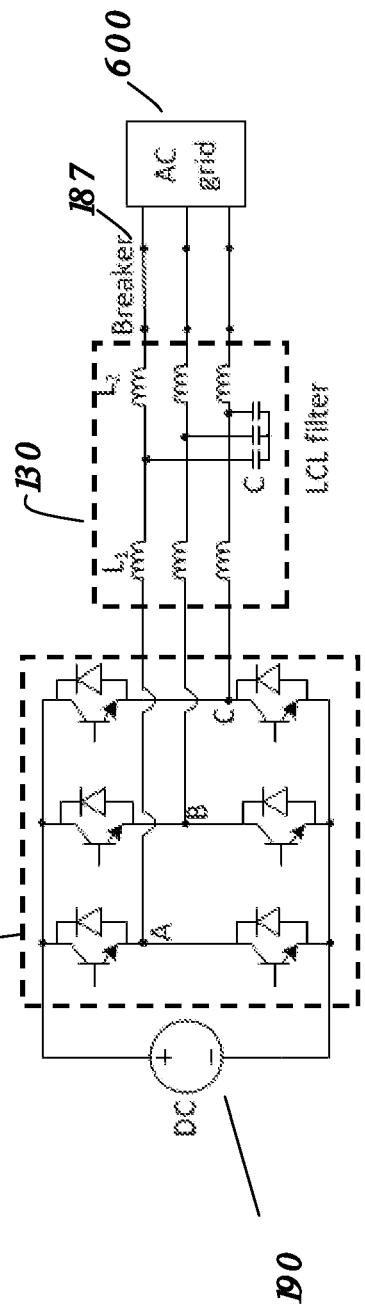
FIG. 2B shows a three-phase grid-tied DC/AC converter with an LCL filter either as inverter or rectifier.
Figure 2C:
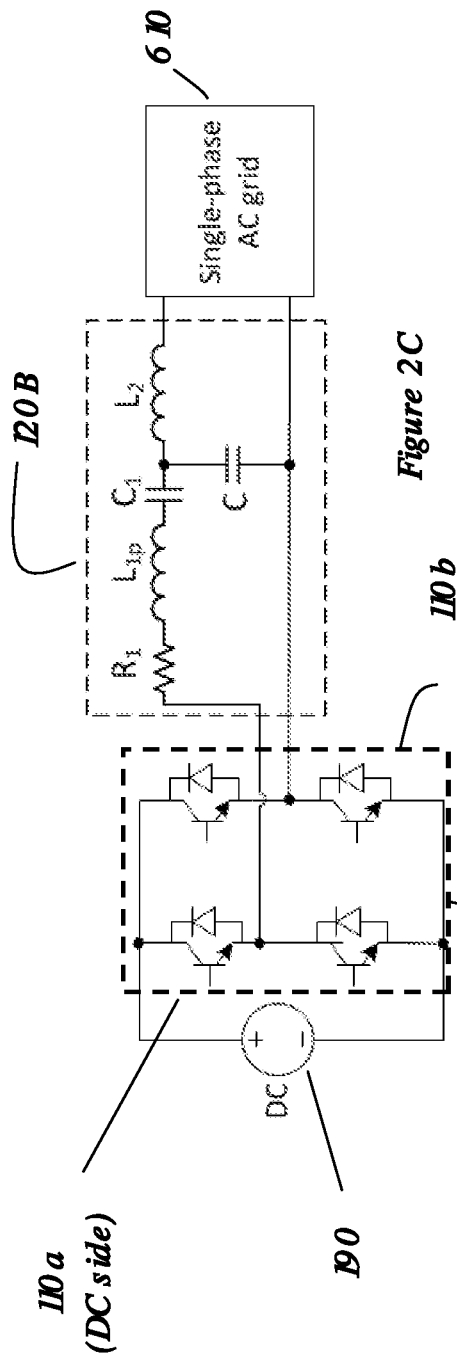
FIG. 2C shows a single-phase grid-tied DC/AC converter with an LCCL filter as disclosed herein either as inverter or rectifier.
Figure 2D:
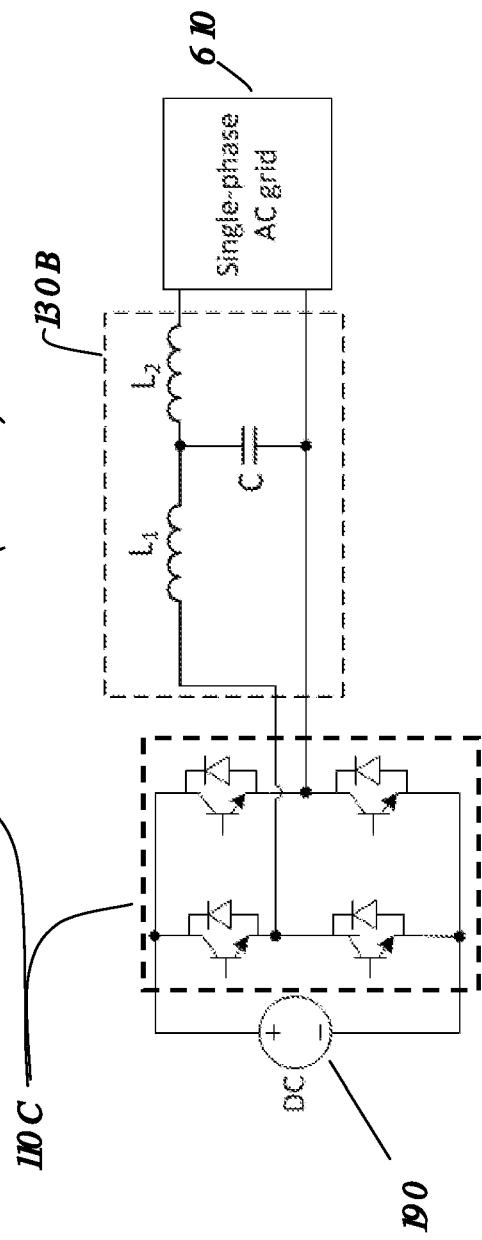
FIG. 2D shows a single-phase grid-tied DC/AC converter with an LCL filter either as inverter or rectifier.

FIG. 1 shows overall circuit of a sample microgrid 100, where DG1 101 acts as grid-forming distributed generator (DG) and is powered by a DC source 190; DG2 102 is a grid-supporting generator while DG3 103 is a grid-feeding generator. Both are powered by DC sources 190. DG4 104 is a conventional generator, which could be diesel-engine powered generator or others. DG4 104 supplies power to its local load 155 and may import or export some power from other parts of the grid through the back-to-back converter 115. The microgrid 100 is connected with the main grid through point of common coupling (PCC). Other components in the microgrid in FIG. 1 include four transformers Trx1 191, Trx2 192, Trx3 193. Trx4 194, and four lines Line1 172, Line2 174, Line3 176, Line4 178, and five breakers 181, 182, 183, 184, 185. In a practical microgrid, there must be at least one grid-forming generator while there could be multiple grid-supporting and grid-feeding generators. The DC sources 190 in the microgrid 100 in FIG. 1 could be replaced by other converter based sources as would be appreciated by the skilled addressee. Each of DG1 101, DG2 102 and DG3 103 is formed by a voltage source inverter (VSI) 110 with an LCCL filter 120 as shown in FIG. 2A, where there are two sides for the DC/AC converter, one being the DC side 110a connected with a DC source 190 and the other being the AC side 110b, and the switches can be IGBT, MOSFET or other alternative switches as would be appreciated by the skilled addressee. The DC source 190 in FIG. 2A could be two capacitors with split neutral for three-phase four-wire application, where two capacitors are charged by other DC sources. When the converter works as a rectifier, then the DC source is replaced by a DC load or an equivalent DC load. FIG. 2B is the voltage source inverter with LCL filter 130. FIG. 2C shows the single-phase DC/AC converter 110C with LCCL filter 120B, where there are two sides for the DC/AC converter, one being the DC side 110a and the other being the AC side 110b. FIG. 2D shows the single-phase DC/AC convener 110C with LCL filter 130B.

Figure 3:
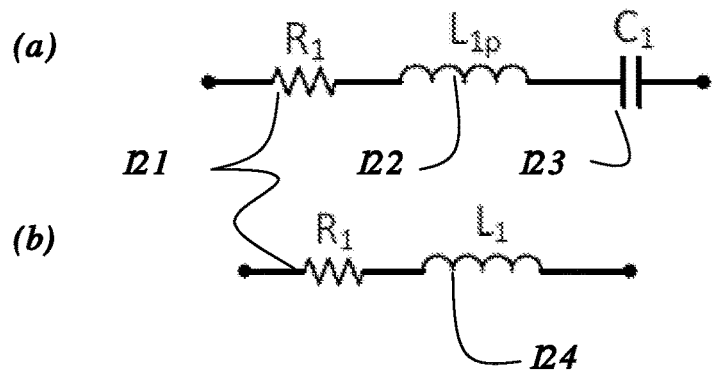
FIG. 3 shows simplification of an RLC circuit to an RL circuit.

Inductor coil $L_{1p}$ 122 and capacitor $C_1$ 123 in LCCL filter 120 are combined in FIG. 3 as an equivalent inductor $L_1$ 124, where $R_1$ 121 is the resultant copper resistance of inductor $L_{1p}$ 122 and capacitor $C_1$ 123, and could be ignored as it is negligible. The basic relationship for $L_1$ 124, $L_{1p}$ 122, and $C_1$ 123, are given by Equations (1), (2) and (3):

$$\omega_0 L_{1p} - \frac{1}{\omega_0 C_1} = \omega_0 L_1 \tag{1}$$

$$L_{1p} = k_{coeff} \cdot L_1 \tag{2}$$

$$C_1 = \frac{1}{\omega_0^2 (k_{coeff} - 1) \cdot L_1} \tag{3}$$

where $k_{coeff}$ depends on the targeted harmonic containment in the operation with output of a fraction of rated power. The lower the fraction, the higher the $k_{coeff}$. The range is $k_{coeff} > 1$. $\omega_0$ is the fundamental angular frequency of the microgrid system 100 shown in FIG. 1.

Figure 4A:
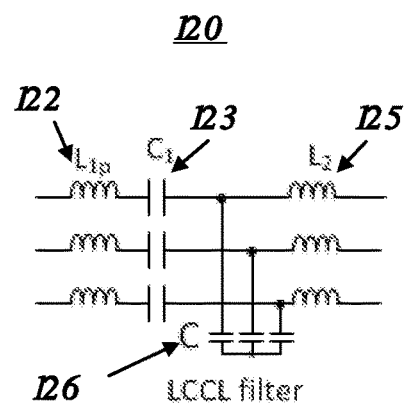
FIG. 4A shows an LCCL filter for three-phase application as disclosed herein.
Figure 4B:
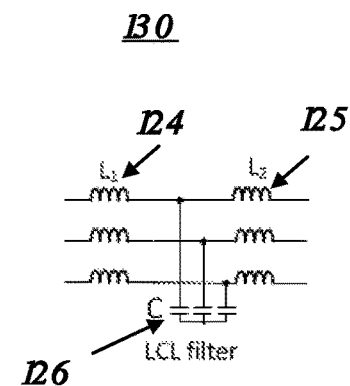
FIG. 4B shows an LCL filter for three-phase application.

The LCCL filter 120 in FIG. 4A can be reduced to an equivalent LCL filter 130 in FIG. 4B by combining $L_{1p}$ 122 with $C_1$ 123 as shown in FIG. 3. Then the values of $L_1$ 124 in FIG. 3, C 126 in FIG. 4A, and $L_2$ 125 in FIG. 4A can be chosen at rated power by using the method described in Daming Zhang, and R. Dutta, "Application of Partial Direct- Pole-Placement and Differential Evolution Algorithm to Optimize Controller and LCL Filter Design for Grid-tied Inverter", AUPEC 2014, Perth, Australia, pp. 1-6, incorporated herein in its entirety by cross-reference, or other methods to meet the requirement of total harmonic distortion of current into the grid at the rated power of the converter. Then $L_{1p}$ 122 and $C_1$ 123 in FIG. 4A can be determined from Equations (2) and (3) for a chosen $k_{coeff}$.

The overall effect of $L_{1p}$ 122 and $C_1$ 123 in series in FIG. 4A at the fundamental frequency is an inductor and is equivalent to one inductor $L_1$ 124. At higher-orders, overall effect of $L_{1p}$ 122 and $C_1$ 123 in series is close to $L_{1p}$ 122 when $k_{coeff}$ is high enough, say 9. Hence the LCCL filter 120 has very good effect to block harmonic current. By following proper design procedure as described in the last paragraph, even if the converter circuit works at a small percentage of rated power, the LCCL filter 120 still can effectively contain harmonic currents.

One may adopt the PQ control method referred above to control grid-tied voltage source DC/AC converters. One of such possible controls is illustrated here, which is based on PQ control with a natural or abc reference frame. The open-loop transfer function of the voltage source DC/AC inverter 110 with LCL filter 130 in FIG. 2B with such control is given by Equation (4). The proportional-resonant controller is given in Equation (5). The coefficients K, $K_p$ and $K_i$ in Equations (4) and (5) are controller parameters and can be determined by using the method described in Darning Zhang, and R. Dutta, "Application of Partial Direct-Pole-Placement and Differential Evolution Algorithm to Optimize Controller and LCL Filter Design for Grid-tied Inverter", AUPEC 2014, Perth, Australia, pp. 1-6, incorporated herein in its entirety by cross-reference, or other methods as would be appreciated by the skilled addressee. The small series coil resistances for both inductor $L_1$ and inductor $L_2$ in LCL filter 130 in FIG. 2B are ignored in Equation (4) as in practice, they are negligible. Although these control parameters are designed for the DC/AC converter with LCL filter 130 in FIG. 2B or FIG. 2D, they are equally applicable to LCCL filter 120 based DC/AC converter in FIG. 2A or FIG. 2C as the series inductor $L_{1p}$ 122 and capacitor $C_1$ 123 in the LCCL filter 120 can be combined as one equivalent inductor $L_1$ 124.

$$G_{ol}(s) = \frac{G_c(s) \cdot K}{L_1 S \cdot L_2 s \cdot Cs + K \cdot Cs \cdot L_2 s + (L_1 S) + (L_2 s)} \quad (4)$$

$$G_c(s) = K_p + \frac{K_i s}{s^2 + \omega_0^2} \quad (5)$$

$$G_{cl}(s) = \frac{G_{ol}(s)}{1 + G_{ol}(s)} \quad (6)$$

The closed-loop transfer function for this PQ control method with natural or abc reference frame is given by Equation (6). For either three-phase or single-phase application, one can use a phase-locked loop or other methods as would be appreciated by the skilled addressee to obtain magnitude and angle of reference voltage. For three-phase application, one can transform from abc-frame to dq-frame to obtain voltage references $v_{gd}$ and $v_{gq}$, then use Equation (7) to produce reference currents. After that, one may use inverse Park transformation to convert dq currents into abc currents. For the single-phase application, one can use Equations (8) and (9) to produce reference current instead. After that, $L_{1p}$ 122 and $C_1$ 123 can be treated as one equivalent inductor $L_1$ 124 and then one can use the same general procedure in PQ control method as for LCL filter based voltage source DC/AC converter to generate gating signals for either three-phase or single-phase applications. Such procedure is described in Erika Twining, and Donald Grahame Holmes, "Grid Current Regulation of a Three-Phase Voltage Source Inverter with an LCL Input Filter", IEEE TRANSACTIONS ON POWER ELECTRONICS, VOL. 18, No. 3, May 2003, pp. 888-895, incorporated herein in its entirety by cross-reference, and other journal and conference papers.

$$\begin{bmatrix} i_d^* \\ i_q^* \end{bmatrix} = \frac{1}{v_{gd}^2 + v_{gq}^2} \begin{bmatrix} v_{gd} & -v_{gq} \\ v_{gq} & v_{gd} \end{bmatrix} \begin{bmatrix} P_{ref} \\ Q_{ref} \end{bmatrix} \quad (7)$$

$$i_2(t) = \sqrt{2} \left( \sqrt{P_{ref}^2 + Q_{ref}^2} / V_{rms} \right) \sin(\omega_0 t + \theta_I) \quad (8)$$

$$\theta_I = \theta_V - \tan^{-1}(Q_{ref}/P_{ref}) \quad (9)$$

FIG. 5A shows the application of a modified LCCL filter 120 (which contains an LCC filter 225 and a shared inductor $L_2$ 125) to multi-stage converters either rectifier or inverter in a Y-connection configuration. The controller signal for each stage in each phase in FIG. 5A is the same and produced by using the PQ control method with the reference voltage being the total voltage across each phase (phase voltage of the source for Y-connection) divided by the number of stages in each phase. The one-phase circuit shown in FIG. 5A can also be used for single-phase application.

Figure 6:
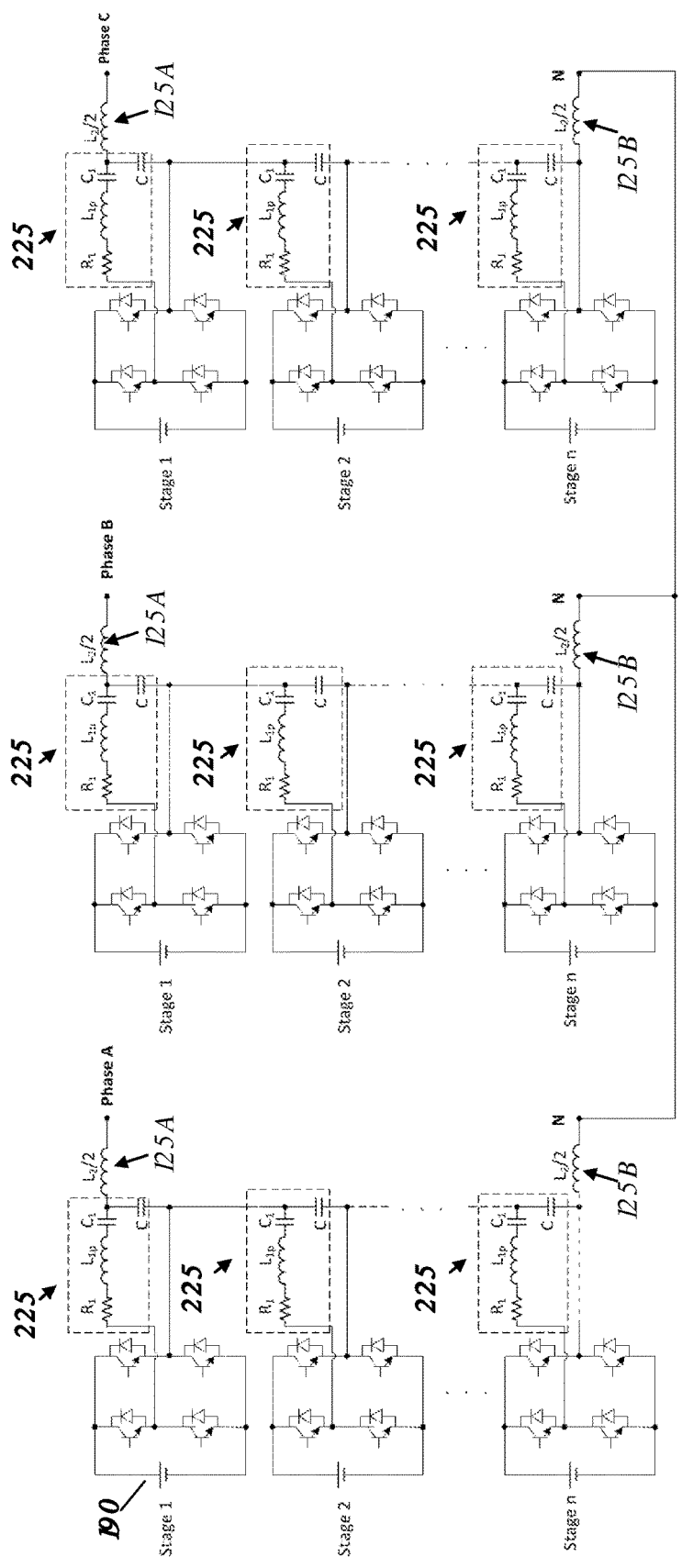
FIG. 6 shows a second example topology for application of an LCCL filter to a multi-stage converter.

The circuit in FIG. 6 is equivalent to that in FIG. 5A. Its control signal is produced in the same way as that for the circuit in FIG. 5A.

Figure 7:
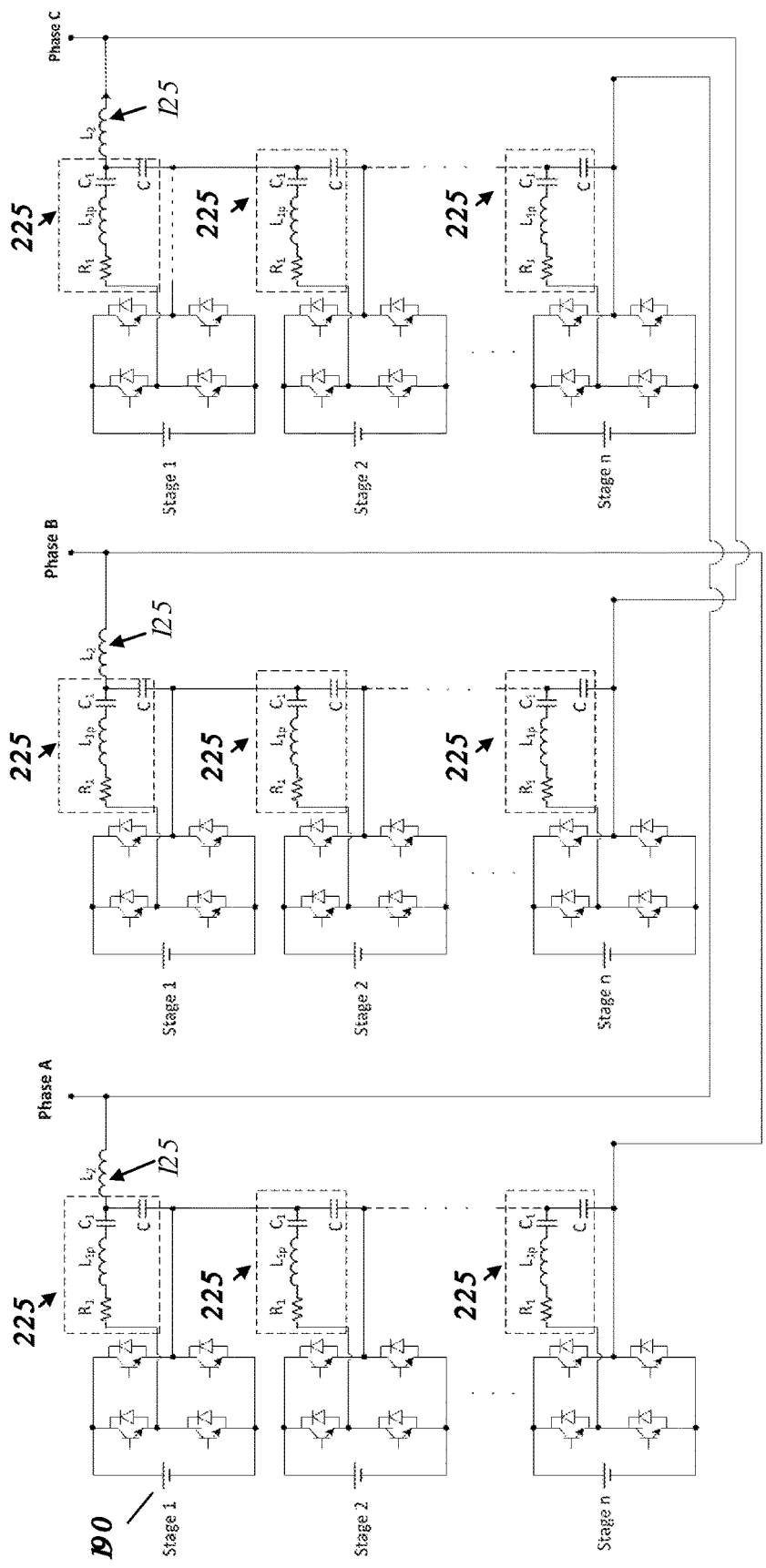
FIG. 7 shows a third example topology for application of LCCL filter to a multi-stage converter.

FIG. 7 shows the application of a modified LCCL filter 120, which contains LCC filter 225 and a shared inductor $L_2$ 125 to multi-stage converter (either rectifier or inverter) which is in delta-connection configuration. The controller signal for each stage in each phase in FIG. 7 is the same and produced by using the PQ control method with the reference voltage being the total voltage across each phase (line-line voltage of the source for delta connection) divided by the number of stages in each phase. One-phase circuit shown in FIG. 7 can also be used for single-phase application.

Figure 8A:
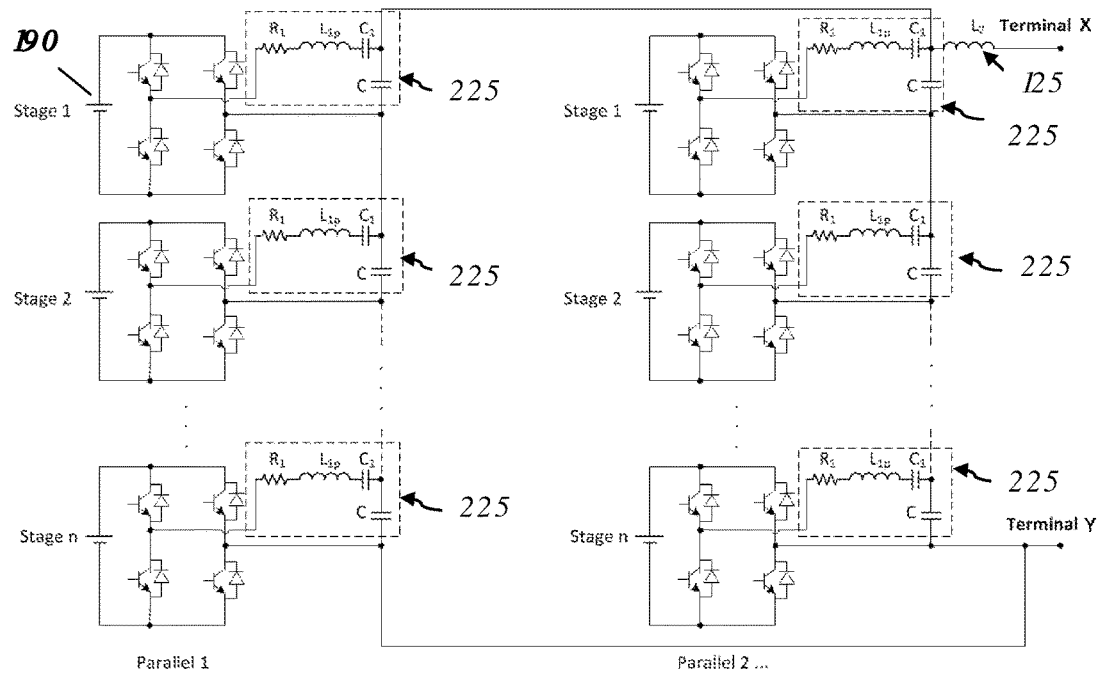
FIG. 8A shows application of LCCL filter to a multi-stage converter with multiple identical parallel branches with shared inductor $L_2$.
Figure 8B:
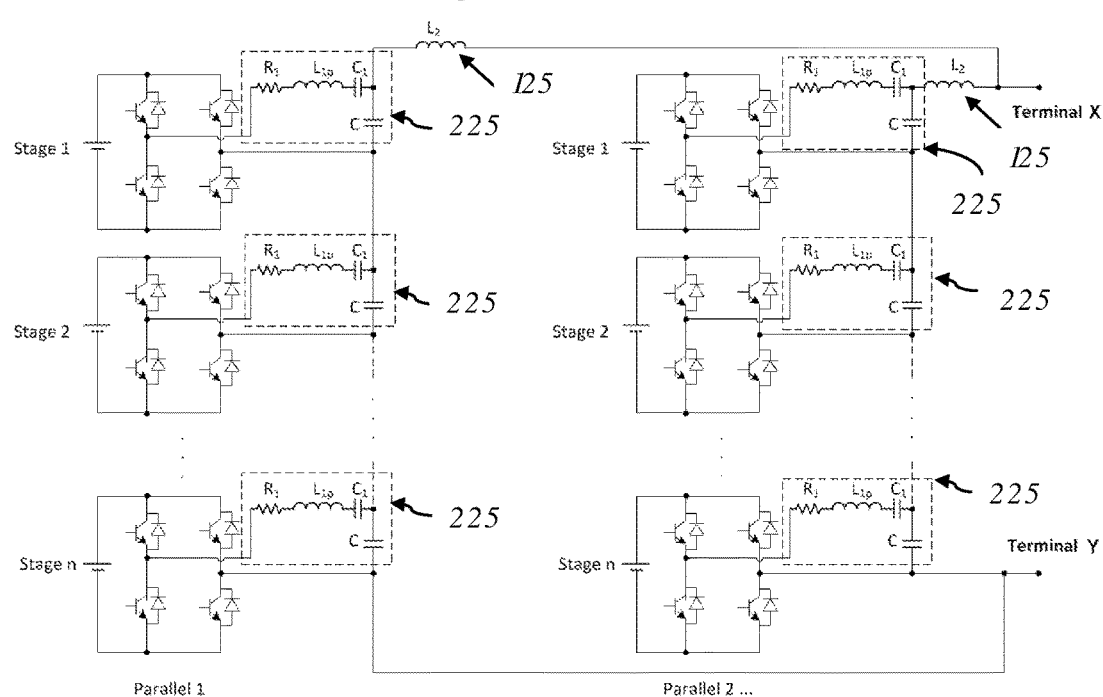
FIG. 8B shows application of LCCL filter to a multi-stage converter with multiple identical parallel branches with individual inductor $L_2$ in each branch.

FIG. 8A and FIG. 8B show the application of a modified LCCL filter 120, which contains LCC filter 225 and a shared inductor $L_2$ 125 to single-phase converter topologies with multiple identical parallel branches, each of which contains multi-stage identical single-phase DC/AC converter with LCC filter 225 with shared and individual inductor $L_2$ 125 respectively, where each of the DC voltage sources 190 could be replaced by DC-link capacitors with other converters. The controller signals for each stage and each parallel branch in the circuit as shown in either FIG. 8A or 8B are the same and are produced by using the PQ control method with reference voltage being total voltage between Terminals X and Y in either FIG. 8A or 8B divided by the number of stages in each parallel branch.

Figure 9A:
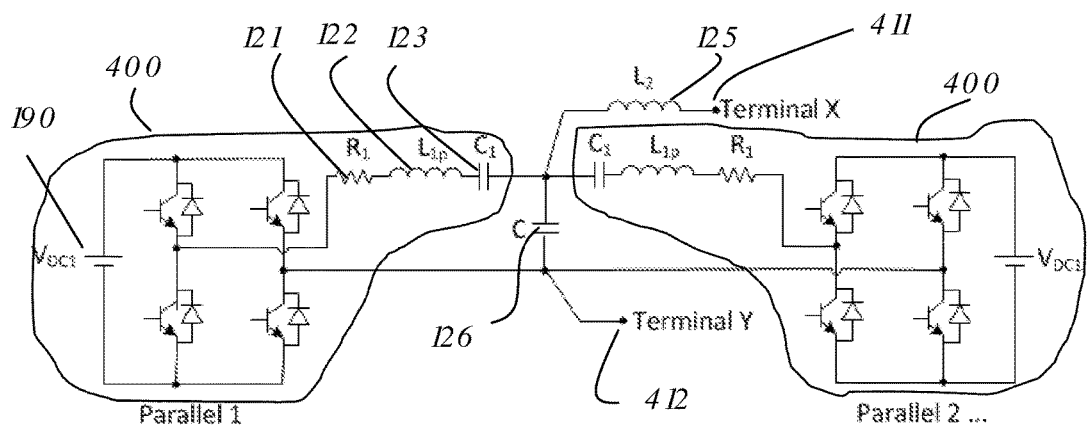
FIG. 9A shows application of modified LCCL filter to circuit topology with multiple identical parallel branches.
Figure 9B:
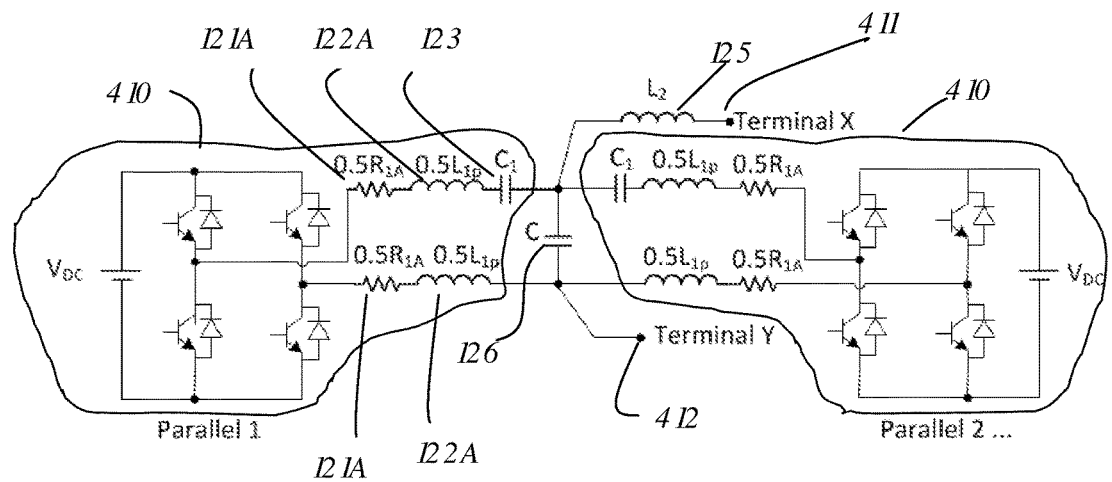
FIG. 9B shows a circuit topology equivalent to that in FIG. 9A.

FIG. 9A shows a new DC/AC converter circuit topology which contains multiple identical parallel branches 400, each of which is formed by a single-phase voltage source DC/AC converter, series $R_1$ 121, series inductor $L_{1p}$ 122 and series capacitor $C_1$ 123. All the parallel branches are joined through the shunt capacitor C 126. In the circuit, each of the DC sources 190 could be replaced by DC-link capacitor and other converters as would be appreciated by the skilled addressee. The circuit topology in FIG. 9B is equivalent to that in FIG. 9A. The controller signals for each parallel branch 400 in the circuit in FIG. 9A are the same and are produced by using the PQ control method with reference voltage being the voltage between Terminals X 411 and Y 412. The controller signals for each parallel branch 410 in the circuit in FIG. 9B are the same and are produced by using the PQ control method with reference voltage being the voltage between Terminals X 411 and Y 412.

Figure 10A:
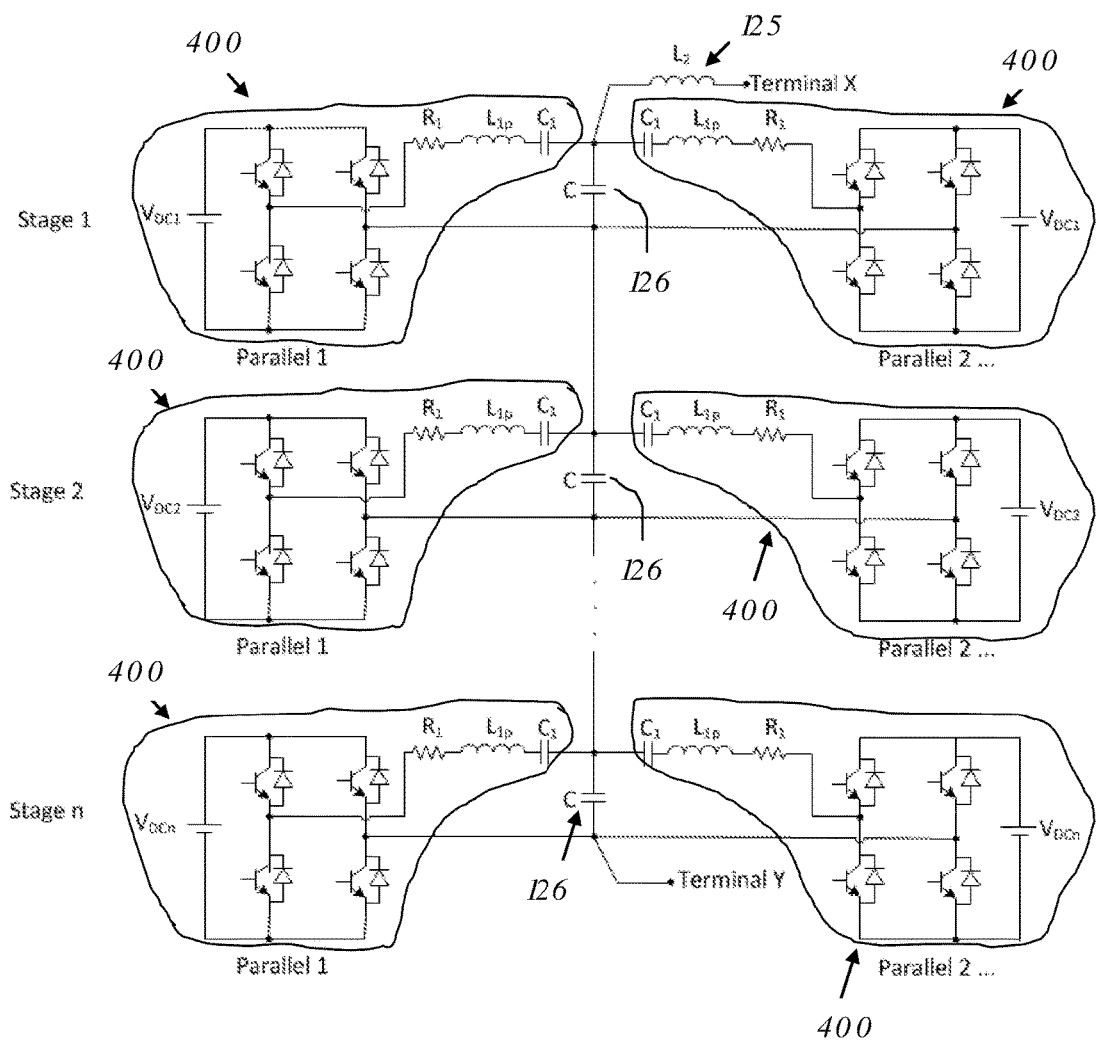
FIG. 10A shows a multi-stage converter formed by multiple identical units from the circuit in FIG. 9A.
Figure 10:
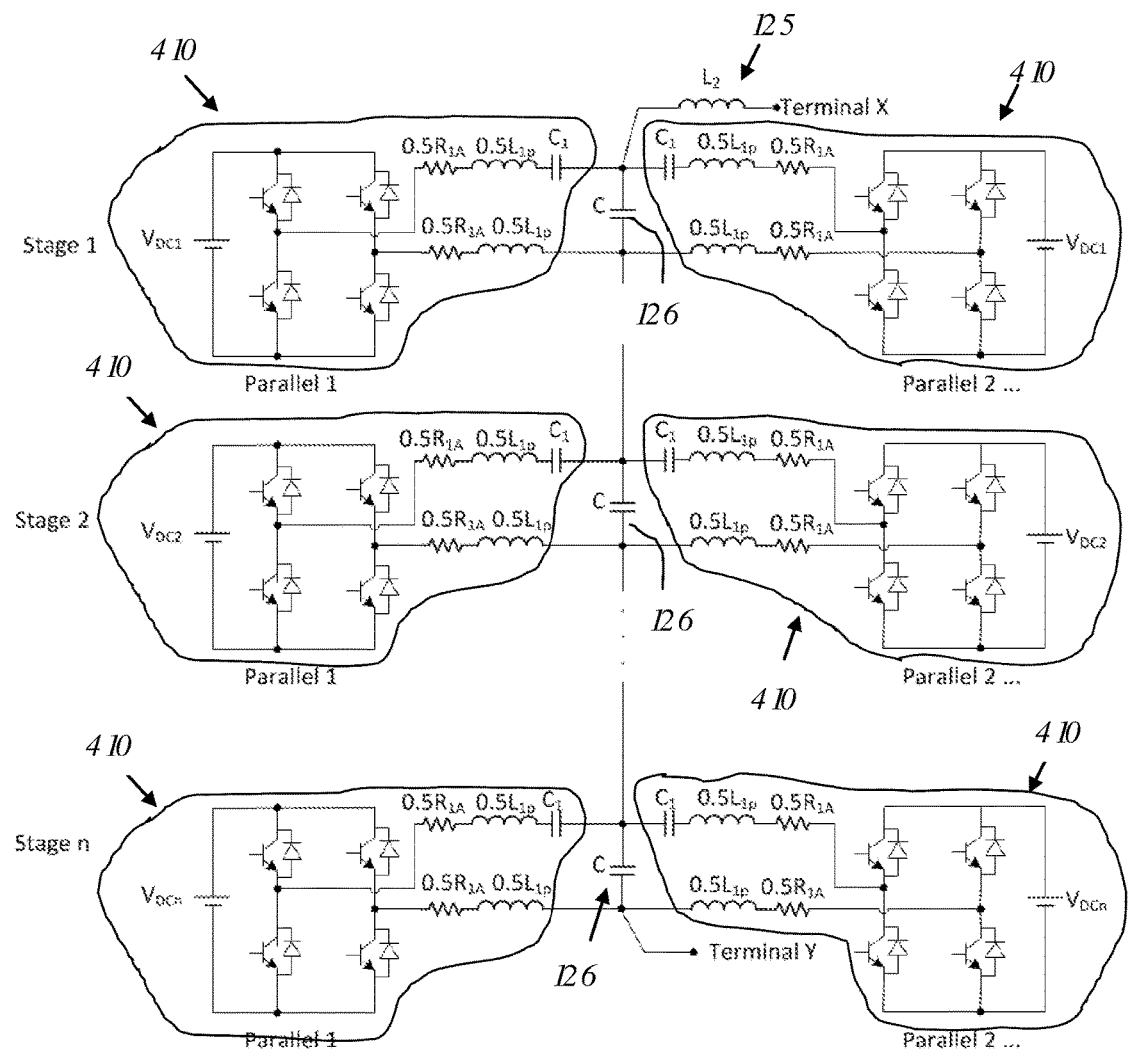
FIG. 10B shows a circuit topology equivalent to that in FIG. 10A.

FIG. 10A shows a new multistage DC/AC converter circuit topology. The first stage is the same as that in FIG. 9A while all the subsequent stages are identical and modified from that in FIG. 9A by removing the series inductor $L_2$ 125. All the stages are connected in series through the shunt capacitor C 126 of each stage and share a common inductor $L_2$ 125 from the first stage. The controller signals for each stage in each parallel branch in the circuit as shown in FIG. 10A are the same and are produced by using the PQ control method with reference voltage being total voltage between Terminals X and Y divided by the number of stages between Terminals X and Y. Circuit in FIG. 10B is equivalent to that in FIG. 10A.

Figure 11:
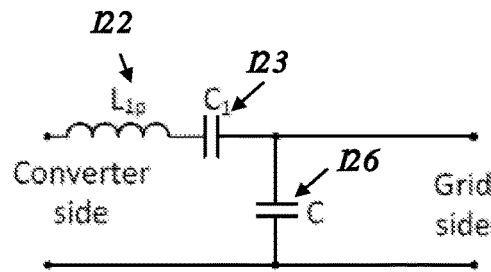
FIG. 11 shows LCC filter.

FIG. 11 shows a LCC filter which contains series-connected $L_{1p}$ 122 and $C_1$ 123 at converter side, and shunt connected C 126 at grid side. By removing $L_2$ 125 at the AC grid or AC load side in the circuits in FIGS. 2A, 4A, 5A, 6, 7, 8A, 8B, 9A, 9B, 10A, and 10B, a new series of circuits are formed.

All the circuit topologies in FIGS. 8A, 8B, 9A, 9B, 10A and 10B can be duplicated for three-phase or multiple phase applications.

Figure 12:
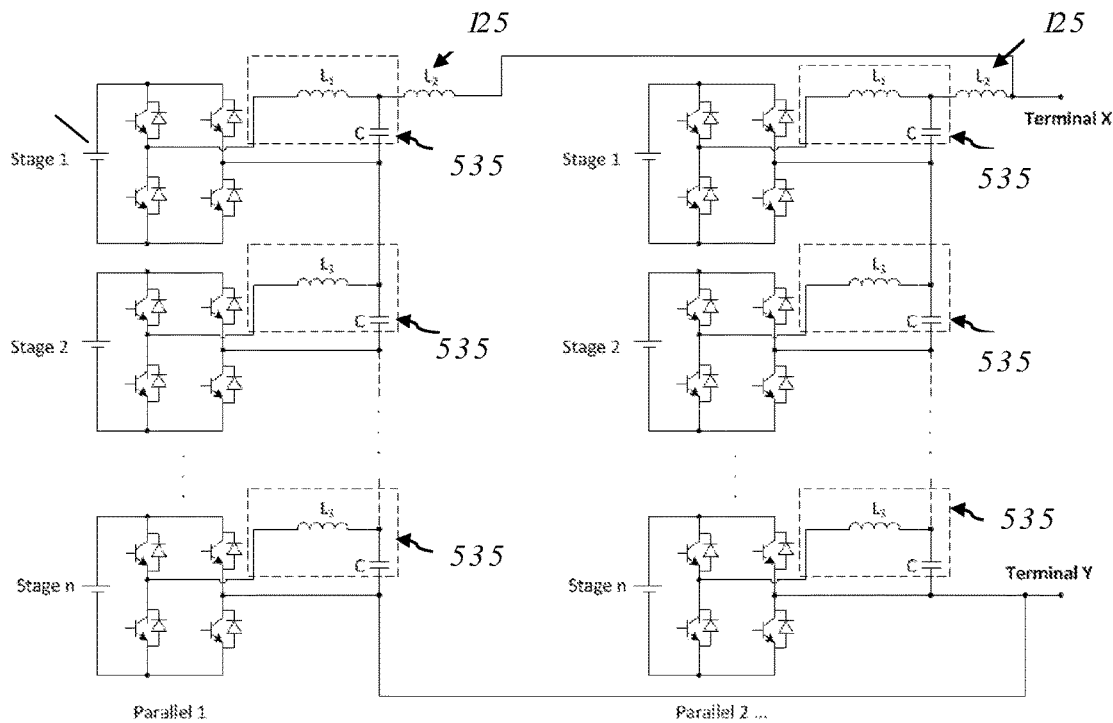
FIG. 12 shows a multistage single-phase DC/AC converter with LCL filter and with multiple identical parallel branches.

FIG. 12 shows a voltage source DC/AC converter developed from that in FIG. 8B.

Figure 13:
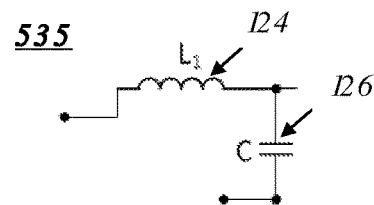
FIG. 13 shows an LC structure.

In the circuit in FIG. 12, only one physical inductor $L_1$ 124 is adopted to replace the series-connected $R_1$ 121, $L_{1p}$ 122 and $C_1$ 123 in FIG. 8B. The circuit part 535 in FIG. 12 is shown in FIG. 13 and it contains only one series inductor $L_1$ 124 and one shunt capacitor C 126. Similarly modifications can be done to the circuits in FIGS. 5A, 6, 7, 8A, 9A, 9B, 10A and 10B by replacing the series-connected $R_1$ 121, $L_1$, 122 and $C_1$ 123 by only one series inductor $L_1$ 124. All the modified circuits in the single-phase form can be duplicated for three-phase and multiple-phase applications. Then a new series of circuit topologies of voltage source DC/AC converters with passive filters are developed.

By incorporating voltage source converters with the LCCL or LCC or LCL filter working as inverters as disclosed herein with methods for controlling grid-forming generator, grid-supporting generators and grid-feeding generators in a microgrid as described in Daming Zhang and Eliathamby Ambikairajah, "De-coupled PQ Control for Operation of Islanded Microgrid", 28-30 September. AUPEC 2015, Wollongong, Australia, pp. 1-6, incorporated herein in its entirety by cross-reference, and Daming Zhang, "Integration of Renewable Energy Generation with Conventional Diesel-engine Powered Generation in a Microgrid", IEEE APPEEC 2015, 15-18 Nov., Brisbane, Australia, pp. 1-5, incorporated herein in its entirety by cross-reference, the islanded microgrid is able to cope with drastic change of renewable energy generation and load changes and operates at high power level and at constant frequency, and also can overcome the drawbacks of conventional control methods as described in the paragraph [0009]. Such method for operating microgrid is defined as constant frequency method for operation of microgrid, which is described in detail in the following paragraphs.

Constant Frequency Method for Operation of Microgrid

Figure 14:
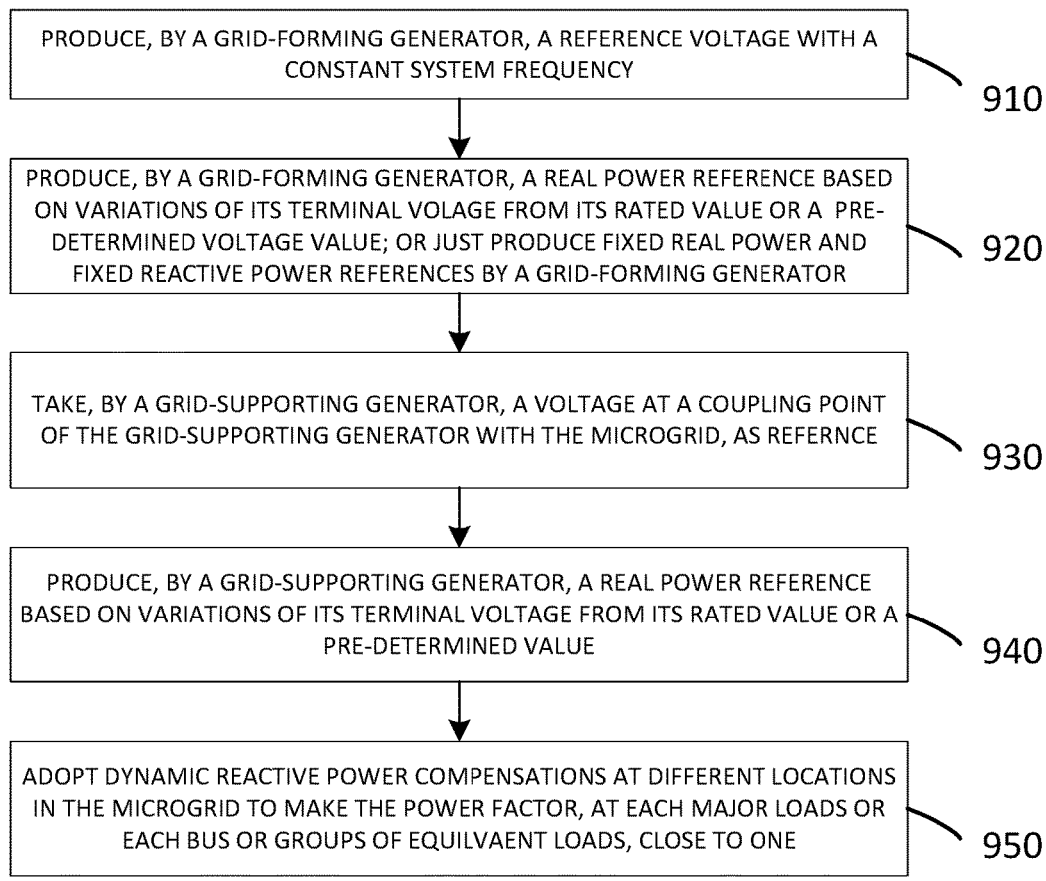
FIG. 14 illustrates a method for operating a microgrid in accordance with an embodiment of the present invention.

The procedures of such method are shown in FIG. 14 in steps of 910 through 950 and described in detail in the following paragraphs.

The microgrid is formed by multiple sources, which are usually classified as grid-forming, grid-supporting and grid-feeding generators, a broad scope of loads and some energy storage systems. For the proper operation of an islanded microgrid, there must be a grid-forming generator, such as DG1 101 in the sample microgrid as shown in FIG. 1. In this technology, constant frequency method for operation of microgrid is adopted. The essence of this method is to de-couple PQ control for the grid-forming generator, which produces its own reference voltage with constant frequency either 50 Hz or 60 Hz or other fundamental frequency, for example $v_{ref}(t)=V_m*\sin(2*\pi*50*t+\theta)$ with $V_m$ being the rated peak voltage or a value with small deviation from the rated peak voltage and θ being initial angle, generates its real power reference based on the deviation of its terminal voltage such as DG1 101's terminal voltage at P1 140 in FIG. 1 from its rated value or other predetermined value, and sets its reactive power reference to a small value or zero. The grid-forming generator DG1 101 could also serve as a reactive power sensor by sensing the output of reactive power at its terminal, and transfers system-demanded reactive power to and from separate reactive power compensators, such as the local reactive power compensator 160 in FIG. 1. The reactive power compensators could be located remotely. Then they should have communication links with the grid forming generator.

Both grid-supporting and grid-feeding generators take their respective terminal voltage as reference voltage for their controller, and they take PQ control method. In the sample microgrid 100 in FIG. 1, DG2 102 is assumed as a grid-supporting generator while DG3 103 is assumed as a grid-feeding generator. So the voltage at terminal P2 is taken as DG2 102's reference voltage for its controller while the voltage at terminal P3 is taken as DG3 103's reference voltage for its controller. For effective real power control by the grid-supporting generators, their reactive power output references should be set to either zero or a very small value while their real power references with pre-set lower and upper limits are produced based on the deviation of their respective terminal voltages from their respective rated values or other specified values.

In some microgrids, there could exist conventional generators such as diesel engine based generations. Then in such systems back-to-back converters could be adopted to interface the conventional generators with the microgrid. When they act as grid-feeding or grid-supporting generators, their grid-side converters take the voltage at common coupling point as reference for their controller. In the sample microgrid 100 in FIG. 1, DG4 104 is assumed as a conventional generator. Then the back-to-back converter 115 is adopted, where 115B is the grid-side converter. If the conventional generators act as grid-forming generators, then their grid-side converters 115B need to work in the same way as the grid-forming generator DG1 101 described in paragraph 0104. In a practical microgrid system, there could be one grid-forming generator or multiple grid-forming generators. When there are multiple grid-forming generators, they could work side-by-side or are remotely located with some in active mode and others in stand-by mode with communication link.

For both grid-forming and grid-supporting generators, it is necessary to produce the real power reference based on the deviation of their respective terminal voltage from their respective rated value or other specified value. One solution is described here to achieve this purpose, and other methods could be adopted as well based on the deviation of their respective terminal voltage from their respective rated value or other specified value.

In Equation (10), $V_{ref}$ is rms value of the rated voltage at the terminal of DC/AC inverter such as at P1 140 in FIG. 1. It could be also equal to a value with small deviation from the rated value. $V_{mag}$ is the rms value of the fundamental component of real-time voltage at the terminal of either grid-forming or grid supporting generator such as at P1 140 in FIG. 1. $\theta_V$ is the angle of fundamental component of real-time phase-A-to-reference-ground voltage at the terminal such as at terminal P1 140 in FIG. 1, while $\theta_I$ is the angle of fundamental component of real-time phase-A current out of either grid-forming or grid-supporting generator such as the current through the breaker 181 in FIG. 1.

$$XY_1 = (V_{ref} - V_{mag}) \times \cos(\theta_V - \theta_1) \quad (10)$$

Equation (11) is to produce a multiplying factor based on $V_{ref}$ and $V_{mag}$ with the range of $F_1$ being greater than 1.

$$XY_2 = F_1 \times [(V_{ref}/V_{mag}) - 1] + 1 \quad (11)$$

The output $XY_1$ from Equation (10) is fed into a proportional integral controller, whose output is fed into a low-pass filter. Finally the output from the low-pass filter is multiplied by the factor $XY_2$ as given by Equation (11) to produce the real power reference for either grid-forming generator or grid-supporting generators. The produced real power reference is bounded by the upper-limit to address the generation capability of each of the grid-forming and grid-supporting generators.

In a relatively large microgrid which includes several grid-supporting generators, the grid-forming generator may just serve the purpose of providing reference voltage with constant frequency either 50 Hz or 60 Hz, and just output fixed real and reactive powers. In this case, the grid-supporting generators act to sustain the voltages at different nodes or buses.

By controlling the grid-forming generator, grid-supporting generators and grid-feeding generators using the methods described in paragraphs 0104 to 0111, the whole microgrid system operates at constant frequency. Furthermore local reactive power compensation could be dynamically implemented for all major power loads at various locations in a microgrid to ensure overall power factor of each major load close to one, such as compensating power factor of each of Load2 152, Load3 153, and Load4 154 to one in the sample microgrid 100 in FIG. 1.

The grid-forming generator could coordinate the real and reactive power balance between generation and load power consumption in the microgrid with other grid-supporting and grid-feeding generators, energy storage units and other reactive power compensators via communication link. The sample energy storage 170 in FIG. 1 could be in different forms, such as battery, vertical heavy mass potential energy storage, compressed hydrogen plus fuel cell etc.

Heavy mass gravitational potential energy storage system can be adopted in a microgrid to store extra energy when the renewable energy generation is in abundance, such as being due to stronger wind. The heavy masses could be stones or metals or other heavy masses, placed in boxes or other solid enclosures or containers. Multiple such enclosures or containers with heavy masses are produced to allow more potential energy storage. Such storage systems are based on the working mechanism by transporting heavy masses from low platforms or low lands to high platforms or high lands. Transporting the boxes or containers with heavy masses from low platforms to high platforms can be achieved by operating electric machines as electric motors. By doing so, the extra electricity produced in the microgrid is converted into potential energy stored in the heavy masses placed to high platforms. When there is a shortage of energy generation in the microgrid, heavy masses are transported from high platforms to low platforms by operating electric machines as electric generators. By doing so, the potential energy stored in heavy masses is converted into electricity which is fed into the microgrid through the electric generators. The interface between driving electric machines and microgrid can be back-to-back converters or other solid-state transformer based bidirectional AC/AC converters if the machines are AC ones. DC machine could also be used. In this case, bidirectional AC/DC converters are adopted to control the machines.

Battery-powered DC/AC converters which act as grid-supporting generators could absorb real power as well when the microgrid has extra power than that consumed by loads. Under such condition, the DC/AC converters work in rectifier mode, and output negative real power into the microgrid or just absorb some real power from the microgrid to charge the batteries. The converters still take the grid-supporting role by reducing possible voltage rise due to extra renewable energy generation and keeping the voltage around rated voltage at each point of coupling between each such DC/AC converter and the microgrid.

A microgrid could be operated in an islanded mode or grid-connected mode. When operating in the grid-connected mode, it is usually connected with a main grid. For practical applications in the future smart grid systems, there could be two or more microgrids neighboring to each other. Then the back-to-back converters can be adopted to interconnect two neighboring microgrids at the coupling point such as at the one as shown in FIG. 1 after breaker 185 and before the joining point with the main grid. Instead of using back-to-back converters to join two neighboring microgrids, other AC power to AC power converters with or without high-frequency link transformer could be adopted too as described in X. She, A. Q. Huang and Rolando Burgos, "Review of solid state transformer technologies and their application in power distribution systems," IEEE Journal of Emerging and Selected Topics in Power Electronics, Vol. 1, No. 3, September, 2013, pp. 186-198. Such converters for joining two microgrids can be designed to be bidirectional. This is to facilitate mutual assistance of neighboring microgrids under the condition that one microgrid is short of power while the other has extra.

Interpretation

In Accordance with:

As described herein, 'in accordance with' may also mean 'as a function of' and is not necessarily limited to the integers specified in relation thereto.

Embodiments

Reference throughout this specification to "one embodiment", "an embodiment", "one arrangement" or "an arrangement" means that a particular feature, structure or characteristic described in connection with the embodiment/arrangement is included in at least one embodiment/arrangement of the present invention. Thus, appearances of the phrases "in one embodiment/arrangement" or "in an embodiment/arrangement" in various places throughout this specification are not necessarily all referring to the same embodiment/arrangement, but may. Furthermore, the particular features, structures or characteristics may be combined in any suitable manner, as would be apparent to one of ordinary skill in the art from this disclosure, in one or more emxbodiments/arrangements.

Similarly it should be appreciated that in the above description of example embodiments/arrangements of the invention, various features of the invention are sometimes grouped together in a single embodiment/arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment/arrangement. Thus, the claims following the Detailed Description are hereby expressly incorporated into this Detailed Description, with each claim standing on its own as a separate embodiment/arrangement of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including:

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also an open term that also means "including at least" the elements/features that follow the term, but not excluding others. Thus, including is synonymous with and means comprising.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to electric power industries.

It will be appreciated that the methods/apparatus/devices/systems described/illustrated above at least substantially provide improved filter circuit topologies and in particular to application of new passive LCCL or LCC filter circuit or their modified topologies to both single-stage and three-phase voltage source DC/AC converters, and applications of these filters to a new series of multistage voltage source DC/AC converters for high voltage and large power applications.

The invented control method for operating microgrid makes its operation more reliable and insusceptible to sharp load change. It can also resist the impact from the drastic change of renewable energy generation. Furthermore such a microgrid system adopts heavy mass energy storage which is more advantageous over battery based storage system when the energy to be stored is tremendous. Hence it has a good potential of applications in power engineering field.

The systems described herein, and/or shown in the drawings, are presented by way of example only and are not limiting as to the scope of the invention. Unless otherwise specifically stated, individual aspects and components of the systems described herein may be modified, or may have been substituted therefore known equivalents, or as yet unknown substitutes such as may be developed in the future or such as may be found to be acceptable substitutes in the future. The systems described herein may also be modified for a variety of applications while remaining within the scope and spirit of the claimed invention, since the range of potential applications is great, and since it is intended that the present systems described herein be adaptable to many such variations.

The claims defining the invention are as follows:

1. A method for operating a microgrid, the method comprising
a grid-forming generator producing its reference voltage with a constant system frequency either 50 Hz or 60 Hz or other fundamental frequency; and
the grid-forming generator producing its output real power reference based on its terminal voltage's variation from its rated value or other predetermined voltage value or producing fixed real and reactive power references; and the grid-supporting generators taking the voltages at their respective coupling points with the microgrid as references; and the grid-supporting generators producing their respective real power references based on their respective terminal voltages' variation from their respective rated values or other pre-determined values, and each of the grid-supporting generators having its respective upper limit for output real power reference; and dynamic reactive power compensations or power factor corrections being adopted at different locations in the microgrid to make the power factor close to one at each of major buses or at each of major loads or groups of loads or groups of equivalent loads.

2. The method as claimed in claim 1, further comprising the step of transferring, by the grid-forming generator, a system-demanded reactive power to and from accompanying or remotely located reactive power compensators and outputting a nearly-zero or other small amount of reactive power.

3. The method as claimed in claim 1, further comprising steps to include domains of conventional generators, wherein conventional generators such as hydro-electric power generations and diesel-engine generations are adopted to power loads in the microgrid in the form of domains, wherein one or multiple such generations are contained in each domain to power loads in that domain; and each domain is interconnected at its every joining point with other parts of the microgrid through back-to-back converters or through other AC power to AC power converters; and through which power is exchanged between each domain and other parts of the microgrid.

4. The method as claimed in claim 3, further comprising steps to store extra energy in the microgrid in gravitational heavy mass potential energy storage systems, wherein the heavy masses are transported from low gravitational level or low lands or low platforms to high gravitational level or high lands or high platforms by operating electric machines as electric motors, when there is an extra energy in the microgrid; and the heavy masses are transported from high gravitational platforms or high lands to low platforms or low lands by operating the electric machines as electric generators to feed the electricity to the microgrid when the microgrid is short of real power.

5. A method to manage inter-connected microgrids operating in island-mode, wherein back-to-back converters or other AC power to AC power converters are adopted to interconnect any two neighbouring microgrids; and each microgrid is operated using the method as claimed in claim 1;

in each microgrid, conventional generators such as hydro-electric power generations and diesel-engine generations are adopted to power loads in the microgrid in the form of domains, wherein each domain may contain one or multiple such generators to power loads in the domain; and each domain is interconnected at its every joining point with other parts of the microgrid through back-to-back converters or through other AC power to AC power converters; and through which power is exchanged between each domain and other parts of the microgrid.

6. The method as claimed in claim 5, further comprising steps to store extra energy in the microgrid in gravitational heavy mass potential energy storage systems, wherein the heavy masses are transported from low gravitational level or low lands or low platforms to high gravitational level or high lands or high platforms by operating electric machines as electric motors, when there is an extra energy in the microgrid; and the heavy masses are transported from high gravitational platforms or high lands to low platforms or low lands by operating the electric machines as electric generators to feed the electricity to the microgrid when the microgrid is short of real power.

* * * * *